United States Patent
Clevelario et al.

(10) Patent No.: US 8,210,775 B2
(45) Date of Patent: Jul. 3, 2012

(54) APPARATUS AND METHOD FOR CONTROLLING MOTION OF A BEND STIFFENER

(75) Inventors: Judimar Clevelario, Rio de Janeiro (BR); Marcio Henriques Albuquerque, Newcastle Upon Tyne (GB); Teofilo Neto, Rio de Janeiro (BR); Hello Marins David Filho, Rio de Janeiro (BR)

(73) Assignee: Wellstream International Limited, Newcastle-Upon-Tyne (GB)

( * ) Notice: Subject to any disclaimer, the term of this patent is extended or adjusted under 35 U.S.C. 154(b) by 357 days.

(21) Appl. No.: 12/376,564

(22) PCT Filed: Jul. 24, 2007

(86) PCT No.: PCT/GB2007/002822
§ 371 (c)(1),
(2), (4) Date: May 12, 2010

(87) PCT Pub. No.: WO2008/017807
PCT Pub. Date: Feb. 14, 2008

(65) Prior Publication Data
US 2010/0213015 A1    Aug. 26, 2010

(30) Foreign Application Priority Data
Aug. 8, 2006    (GB) .................................. 0615723.4

(51) Int. Cl.
*F16L 1/235* (2006.01)
(52) U.S. Cl. .................... 405/168.2; 405/158; 405/168.1

(58) Field of Classification Search .................. 405/158, 405/166, 168.1, 168.2, 169, 170, 171, 172, 405/173
See application file for complete search history.

(56) References Cited

U.S. PATENT DOCUMENTS

| | | | | | |
|---|---|---|---|---|---|
| 3,955,599 | A | * | 5/1976 | Walker | 405/169 |
| 4,647,255 | A | * | 3/1987 | Pow | 405/168.1 |
| 4,671,702 | A | * | 6/1987 | Langner | 405/169 |
| 4,725,088 | A | * | 2/1988 | Mank | 294/90 |
| 4,808,034 | A | * | 2/1989 | Birch | 405/195.1 |

(Continued)

FOREIGN PATENT DOCUMENTS
EP       0565445 A1    10/1993
(Continued)

OTHER PUBLICATIONS

International Search Report and Written Opinion of the International Searching Authority, mailed Oct. 18, 2007, for corresponding International Application No. PCT/GB2007/002822.

(Continued)

*Primary Examiner* — Frederick L Lagman
(74) *Attorney, Agent, or Firm* — Klarquist Sparkman, LLP

(57) ABSTRACT

A method and apparatus is disclosed for governing motion of a bend stiffener along a flexible pipe. The apparatus includes a stopper clamp secured to a portion of flexible pipe body and at least one retardation element located on the flexible pipe body at a predetermined position with respect to the stopper clamp. The retardation element is arranged to reduce momentum of a bend stiffener as it moves along the portion of flexible pipe body in a direction towards the stopper clamp.

15 Claims, 11 Drawing Sheets

U.S. PATENT DOCUMENTS

| | | | |
|---|---|---|---|
| 5,437,518 A | | 8/1995 | Maloberti et al. |
| 7,789,588 B2 | * | 9/2010 | De Aquino et al. ........ 405/168.2 |
| 2008/0087435 A1 | * | 4/2008 | Reddy ........................... 166/343 |
| 2009/0020061 A1 | * | 1/2009 | Dybvik et al. ............ 114/230.28 |
| 2011/0094748 A1 | * | 4/2011 | Reddy ........................... 166/343 |

FOREIGN PATENT DOCUMENTS

| | | | |
|---|---|---|---|
| GB | 2424684 A | 10/2006 | |

OTHER PUBLICATIONS

International Preliminary Report on Patentability and Written Opinion of the International Searching Authority, mailed Feb. 10, 2009, for corresponding International Application No. PCT/GB2007/002822.

* cited by examiner

APPARATUS AND METHOD FOR CONTROLLING MOTION OF A BEND STIFFENER

CROSS REFERENCE TO RELATED APPLICATIONS

This is the U.S. National Stage of International Application No. PCT/GB2007/002822, filed Jul. 24, 2007, which in turn claims the benefit of and priority to Great Britain Application No. GB0615723.4, filed Aug. 8, 2006.

The present invention relates to apparatus and a method for governing motion of a bend stiffener along a flexible pipe. In particular, but not exclusively, the present invention relates to the use of a stopper clamp secured to a portion of flexible pipe body and at least one further element arranged to retard motion of a bend stiffener as it falls towards the stopper clamp.

Traditionally flexible pipe is utilized to transport production fluids, such as oil and/or gas and/or water, from one location to another. Flexible pipe is particularly useful in connecting a sub-sea location to a sea level location. Flexible pipe is generally formed as an assembly of a pipe body and one or more end fittings. The pipe body is typically formed as a composite of layered materials that form a pressure-containing conduit. The pipe structure allows large deflections without causing bending stresses that impair the pipe's functionality over its lifetime. The pipe body is generally built up as a composite structure including metallic and polymer layers.

An end fitting permits the pipe body to be secured to a rigid structure. Such a structure may be a surface vessel or surface rig or undersea structure. As such, in the end fitting, the flexible pipe body is terminated in a generally cup-shaped rigid housing as is known in the art. As an alternative rather than securing an end fitting to a rigid structure, the flexible pipe body may be mounted so as to pass in a coaxial manner with a fitting. The fitting can be secured to a rigid structure via a bell mouth arrangement or some other connecting means which will maintain the flexible pipe body in a fixed orientation with the structure. The flexible pipe may, however, be allowed to slide longitudinally within the connector. In either instance where a flexible pipe body is secured or constrained with respect to a rigid structure, a bend stiffener is utilized close to the connector or end fitting so as to gradually moderate the stiffness of the flexible pipe. This prevents over bending stresses which might damage the flexible pipe body being generated if a portion of the flexible pipe body, which may for example rise and fall with a sea level, is moved respective to the rigid structure.

When the connector or end fitting is secured to the rigid structure, the bend stiffener, which is a bulky component which may have a mass in excess of 500 kgs, must be slid along the flexible pipe body to a desired location. This forms part of a tie-in process. During this process the bend stiffener and portion of flexible pipe body are typically orientated in a vertical direction. If the bend stiffener is unsupported partially or wholly due to an error during assembly the end stiffener can plummet down the length of the pipe by virtue of gravitational force. This can be highly inconvenient, particularly if the flexible pipe body is long.

In order to overcome such problems stopper clamps have been proposed in the past which are located a predetermined distance from the location where the bend stiffener is to be secured. If during assembly a mistake is made and the bend stiffener is accidentally unsupported, the bend stiffener will drop but only to a depth, for example, 30 meters to a location where the stopper clamp is clamped to the flexible pipe. This prevents the bend stiffener being lost but is still highly inconvenient since the bend stiffener may hit the stopper clamp with a high dynamic load and may tear/strip an outer sheath of the flexible pipe body as it falls. As such the pipe then has to be cut and reassembled prior to termination of the fitting at a desired location with respect to a structure. This occurrence introduces a very high cost due to stop of production and ancillaries manufacturing time.

It is an aim of the present invention to at least partly mitigate the above-mentioned problems.

It is an aim of embodiments of the present invention to provide a means for governing motion of a bend stiffener as it falls subsequent to assembly mistake whereby damage to a flexible pipe body is lessened or avoided totally.

It is an aim of embodiments of the present invention to provide a method of securing a bend stiffener to an end fitting or other such structure of a flexible pipe whereby if a mistake is made a bend stiffener is not lost and the mistake can be rectified as conveniently and quickly as possible.

According to a first aspect of the present invention there is provided an apparatus for governing motion of a bend stiffener along a flexible pipe, comprising:

a stopper clamp secured to a portion of flexible pipe body; and at least one retardation element located on the flexible pipe body at a predetermined position with respect to the stopper clamp; wherein said retardation element is arranged to reduce momentum of a bend stiffener as it moves along said portion of flexible pipe body in a direction towards said stopper clamp.

According to a second aspect of the present invention there is provided a method for governing motion of a bend stiffener along a flexible pipe, comprising the steps of:

securing a stopper clamp to a portion of flexible pipe body;

providing at least one retardation element on the pipe body at a predetermined location with respect to the stopper clamp; and if a bend stiffener moves along the portion of flexible pipe body, reducing the momentum of the bend stiffener via said retardation element.

Embodiments of the present invention provide one or more retardation elements which are located between a stopper clamp on a flexible pipe and a location where a bend stiffener is to be mounted. If an assembly mistake occurs the retardation element partially or wholly retards motion of the bend stiffener so that a drop of the bend stiffener along the flexible pipe body causes minimal or zero damage.

Embodiments of the present invention provide a combination of various optional retardation elements whereby in combination motion of a bend stiffener along the flexible pipe body can be wholly prevented.

Embodiments of the present invention will now be described hereinafter, by way of example only, with reference to the accompanying drawings in which.

In the drawings like reference numerals refer to like parts.

Figure 1:
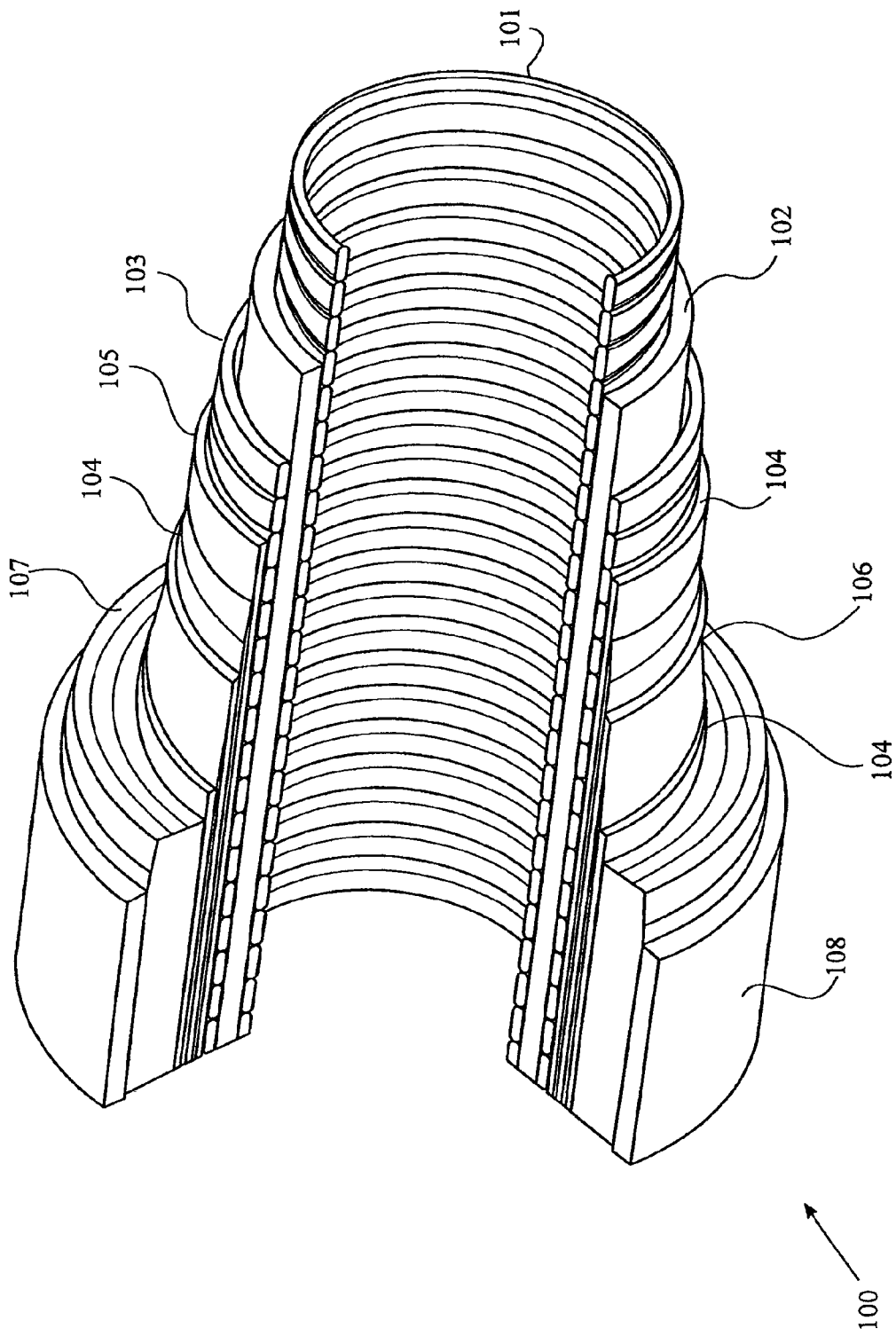
FIG. 1 illustrates a flexible pipe body.

Throughout this specification reference will be made to a flexible pipe. It will be understood that a flexible pipe is an assembly of a pipe body and one or more end fittings in each of which an end of the pipe body is terminated. FIG. 1 illustrates how a pipe body 100 is formed from a composite of layered materials that form a pressure-containing conduit. Although a number of particular layers are illustrated in FIG. 1, it is to be understood that the present invention is broadly applicable to composite pipe body structures including two or more layers.

As illustrated in FIG. 1, a pipe body typically includes an inner most carcass layer 101. The carcass provides an interlocked metallic construction that can be used as the innermost layer to prevent, totally or partially, collapse of an internal pressure sheath 102 due to pipe decompression, external pressure, tensile armour pressure and mechanical crushing loads.

The internal pressure sheath 102 typically comprises a polymer layer that ensures internal-fluid integrity. It is to be understood that this barrier layer may itself comprise a number of sub-layers.

A pressure armour layer 103 is a structural layer with a lay angle close to 90° that increases the resistance of the flexible pipe to internal and external pressure and mechanical crushing loads. The layer also structurally supports the internal-pressure sheath and typically consists of an interlocked metallic construction.

The flexible pipe body may also include one or more layers of tape 104 and a first tensile armour layer 105 and second tensile armour layer 106. Each tensile armour layer is a structural layer with a lay angle typically between 20° and 55°. Each layer is used to sustain tensile loads and internal pressure. The tensile armour layers are typically counter-wound in pairs.

The flexible pipe body also typically includes layers of insulation 107 and an outer sheath 108 which comprises a polymer layer used to protect the pipe against penetration of seawater and other external environments, corrosion, abrasion and mechanical damage.

Each flexible pipe comprises a segment of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
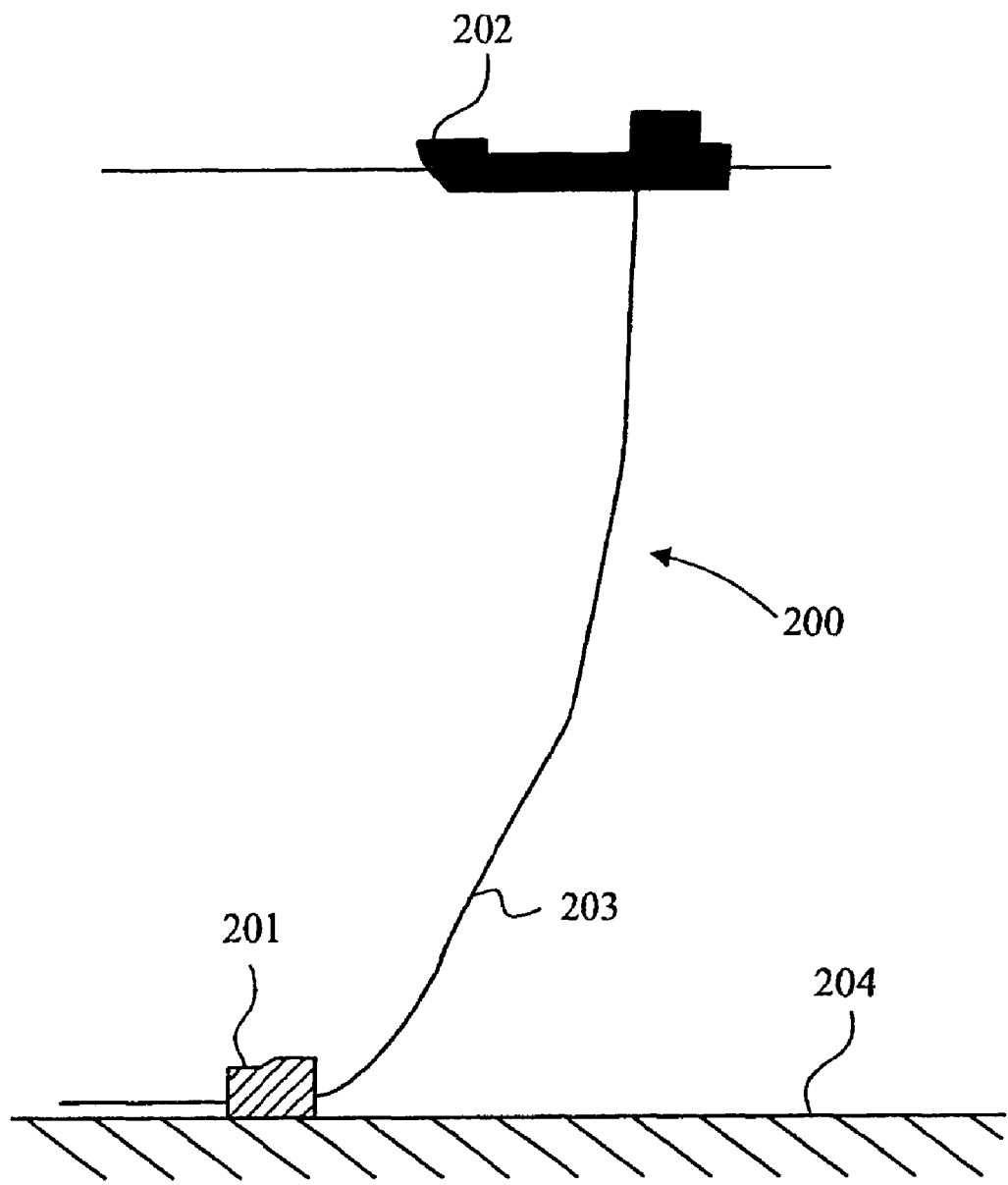
FIG. 2 illustrates a riser connecting an undersea structure to a floating structure.

FIG. 2 illustrates a riser assembly 200 suitable for transporting production fluid such as oil and/or gas and/or water from a sub-sea location 201 to a floating facility 202. For example, in FIG. 2 the sub-sea location 201 is a sub-sea flow line. The flexible flow line 203, comprises a flexible pipe, wholly or in part, resting on the sea floor 204 or buried below the sea floor and used in a static application. The floating facility may be provided by a platform and/or buoy or, as illustrated in FIG. 2, a ship. The riser 200 is provided as a flexible riser, that is to say a flexible pipe connecting the ship to the sea floor installation.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

In addition to termination of flexible pipe body in an end fitting, embodiments of the present invention are also applicable where flexible pipe body is guided through a rigid structure. In such situations the flexible pipe body must be orientated rigidly with respect to the structure but some lateral motion of the flexible pipe body may be permitted. In either this circumstance, or where flexible pipe body is terminated in an end fitting which may be then secured to a rigid structure, a bend stiffener is utilized. It is to be appreciated that embodiments of the present invention are generally applicable wherever a bend stiffener is required.

Figure 3:
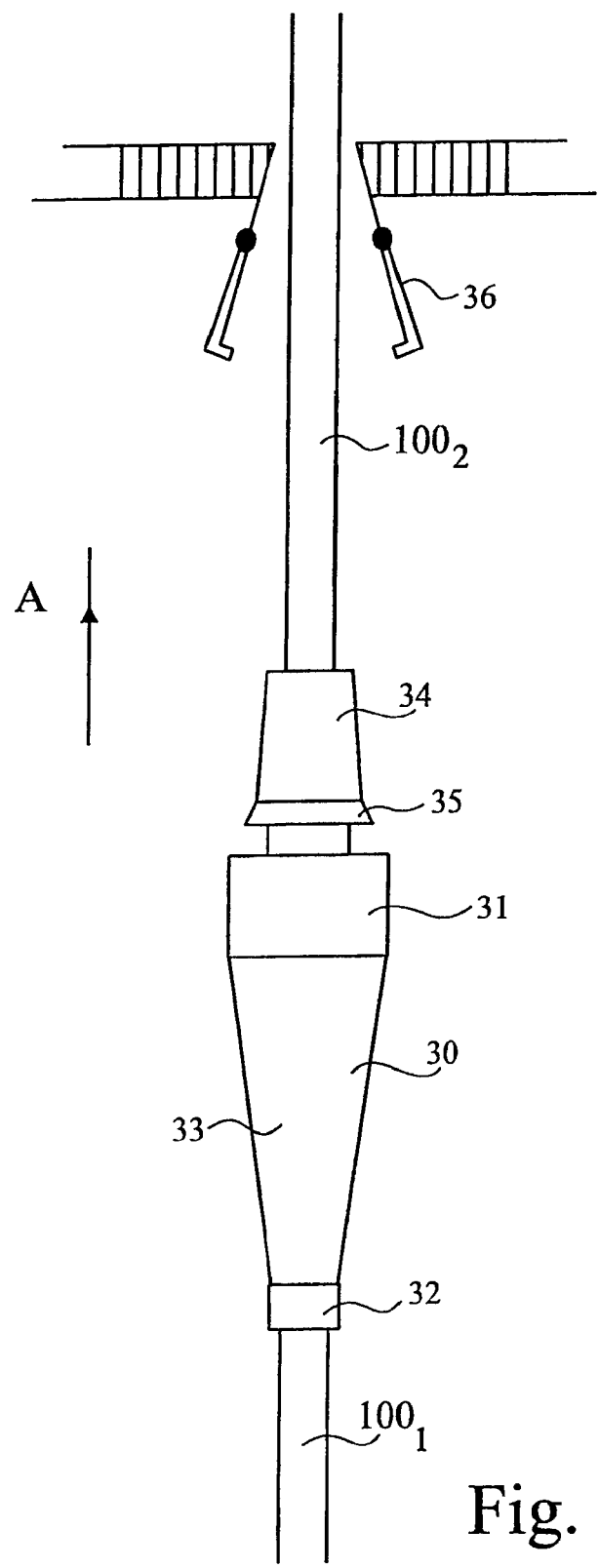
FIG. 3 illustrates a bend stiffener and connector.

FIG. 3 illustrates a bend stiffener 30 mounted coaxially with a segment of flexible pipe body 100. The flexible pipe body 100 includes a lower portion $100_1$, and an upper portion $100_2$. The bend stiffener 30 includes an upper substantially rigid section 31 and a lower neck region 32. Between the rigid upper portion 31 and neck region 32, a tapering body portion 33 is provided. The conical section 33 reduces in rigidity from the upper rigid section 31 to the lower neck region 32. In this way the lower region about the neck 32 of the bend stiffener 30 has a flexibility roughly matching that of the flexible pipe body section $100_1$. By contrast the bend stiffener stiffness blends into a substantially rigid top section 31. As such the top section of the bend stiffener has a rigidity approximately matching that of a structure to which it is secured. The rigid section 31 is secured to an attachment mechanism 34 which includes a locking surface 35 arranged to mate with a locking mechanism 36 on a rigid structure such as a floating facility 202. It will be appreciated that during assembly of a flow line the bend stiffener 30 and associated attachment 34 are "threaded" onto a segment of flexible pipe body. They are then moved upwardly in the direction shown by arrow A in FIG. 3 to lock the bend stiffener in place with respect to the floating facility. Lateral motion, in the longitudinal direction, of the flexible pipe body 100 is possible within the bend stiffener and attachment. It is to be appreciated that in this assembly mode of operation, which is sometimes referred to as a tie in operation, gravitational force will act on the bend stiffener 30 in a direction substantially opposite to the direction illustrated by arrow A in FIG. 3. Since the bend stiffener can have a mass in excess of 500 kgs, it will be appreciated that during the connection a good deal of support must be provided to the bend stiffener in an upward direction to prevent the bend stiffener and associated attachment mechanism from plummeting downwards away from the rigid structure 202.

Figure 4:
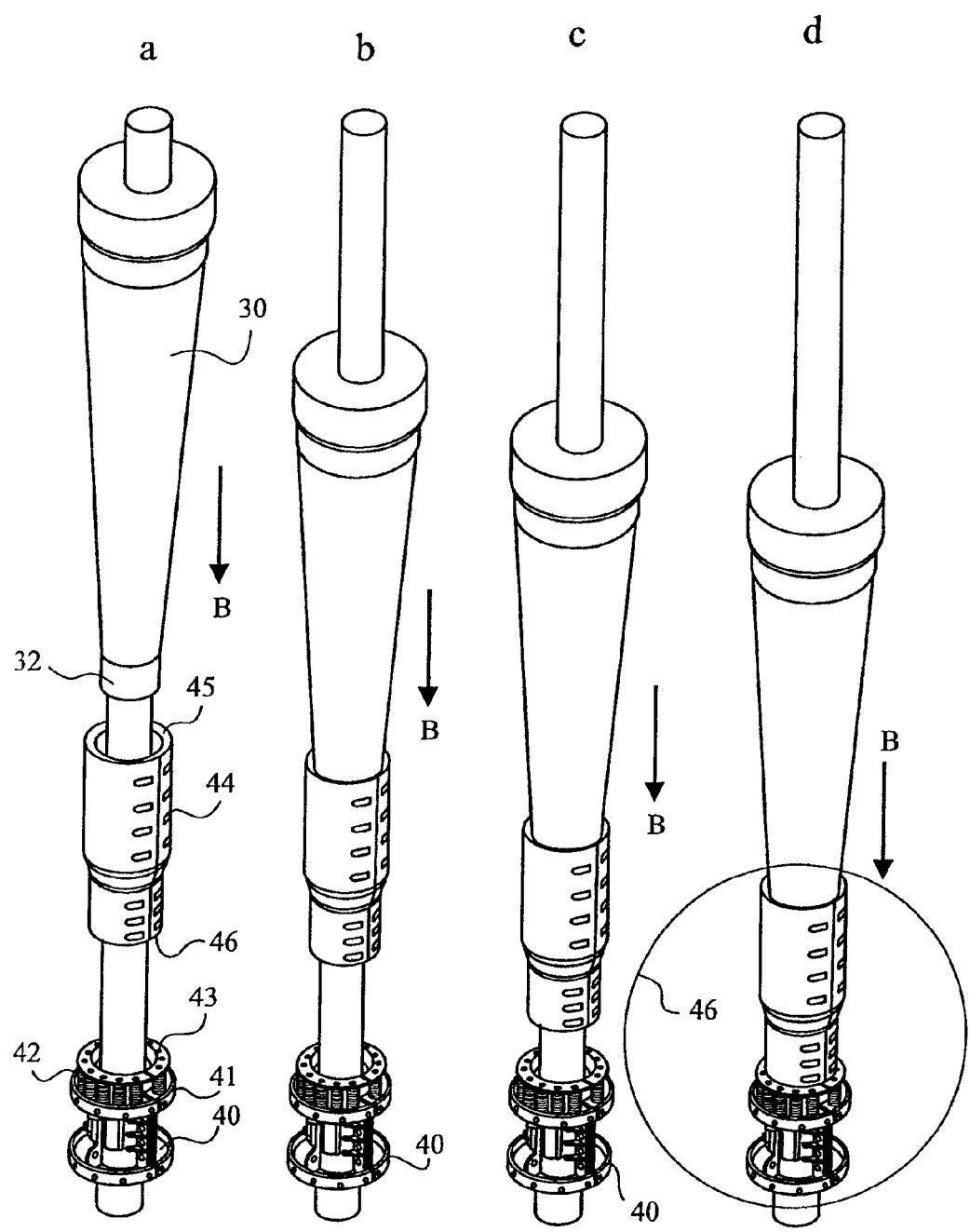
FIG. 4 illustrates a retarding element.

In accordance with an embodiment of the present invention FIG. 4 illustrates how the plummeting motion of the bend stiffener can be prevented when an error occurs during assembly. FIG. 4 illustrates consecutive stages of a bend stiffener motion in a direction illustrated by arrow B in FIG. 4. FIG. 4a illustrates an initial stage in a plummeting phase in which the bend stiffener 30 begins motion downwardly subsequent to a mistake being made.

A stopper clamp 40 is clamped to the flexible pipe body at a preselected location below a location where the bend stiffener is to be secured to a rigid structure. For example, the stopper clamp may be clamped to the outer sheath of a flexible pipe body around 30 meters below the rigid structure. The stopper clamp 40 includes sections which may be bolted together and in a secured position the stopper clamp is effectively locked in place with respect to a flexible pipe body. Motion of the stopper clamp downwardly with respect to the flexible pipe body is substantially prevented by the clamping process. An upper surface 41 of the stopper clamp 40 provides a ring-shaped plate surface upon which a number of compression springs 42 are mounted. An upper ring-shaped abutment plate 43 is secured to upper ends of each of the springs.

An intermediate sleeve is also provided at a location between the stopper clamp and a position where the bend stiffener is to be secured to a rigid structure. The intermediate sheath 44 includes a bend stiffener neck engaging surface 45 together with a lower surface 46 which will abut with the upper ring 43 secured to the stopper clamp. An inner surface of the intermediate sheath 44 has an inner diameter closely matching an outer diameter of the flexible pipe body so that in general use the sheath may be fixed at a desired location by virtue of friction.

Subsequent to an error being made during assembly the bend stiffener 30 will begin to plummet downwardly in the direction illustrated by arrow B in FIG. 4. As shown in FIG. 4*b* the neck region 32 of the bend stiffener will come into contact with the intermediate sheath 44. The sheath will then begin to move downwardly with the bend stiffener. The outer surface of the bend stiffener and inner and upper surface of the intermediate sheath 44 are shaped so as to cooperate and mate. As illustrated in FIG. 4*c* the bend stiffener and intermediate sheath will continue to move downwardly although this movement will be at least partially retarded by the close friction fitting of the intermediate sheath.

The close friction fit of the intermediate sheath 44 is generally not sufficient to prevent downward motion of the bend stiffener in total. Therefore, as illustrated in FIG. 4*d*, the bend stiffener and intermediate sheath which move as one will eventually impact onto the upper surface of the upper ring 43. This will cause a compression of the array of springs arranged circumferentially around the upper surface of the stopper clamp. Characteristics of the compression springs are selected so that the impact of the bend stiffener and attached intermediate sheath will be absorbed by the springs. This will thus bring motion of the bend stiffener and sheath to a halt. Because of the impact absorbing nature of the springs the impact is absorbed without causing any tearing motion on the flexible pipe body.

Figure 5:
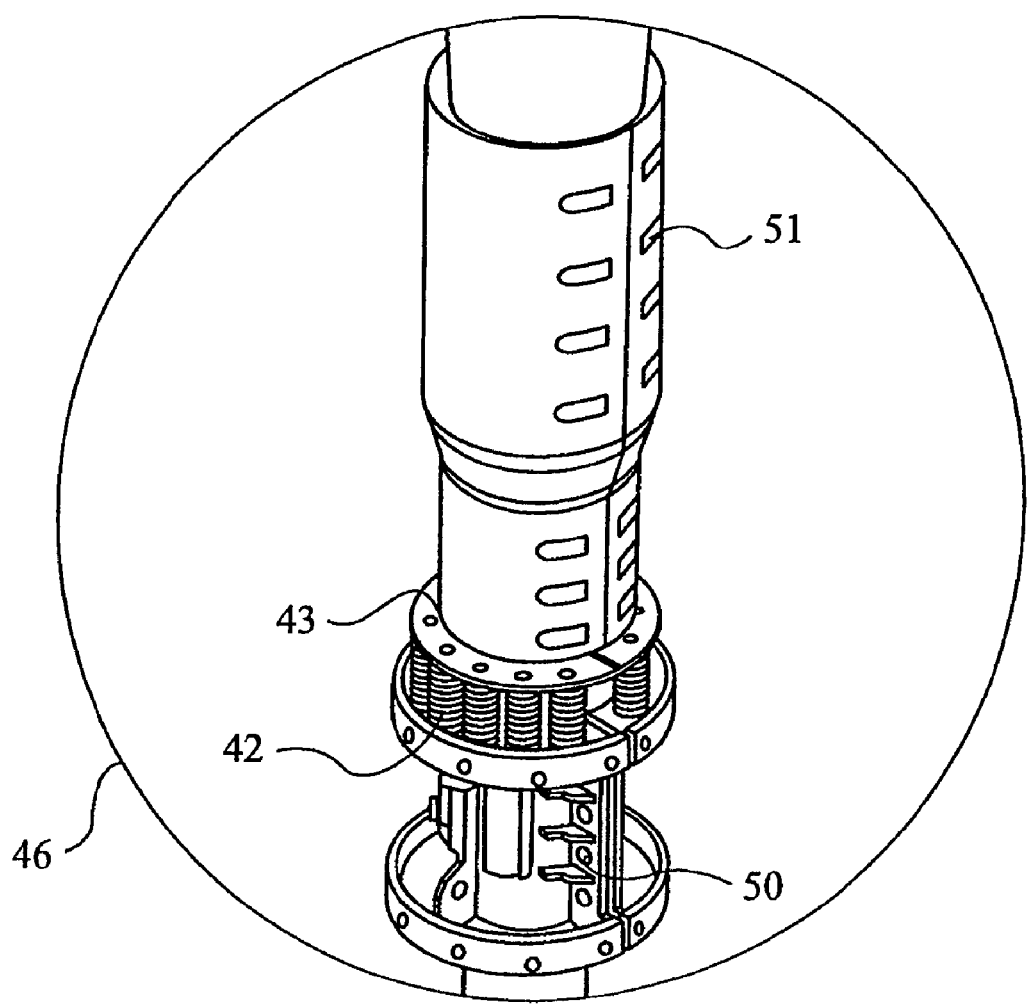
FIG. 5 illustrates a detail of FIG. 4.

FIG. 5 illustrates the detail of circle 46 shown in FIG. 4 in more detail. The stopper clamp includes sections which are bolted together by bolts 50 or some other such securing means. The stopper clamp includes a lower ring formed by corresponding parts of the sections bolted together as well as an upper portion again formed by corresponding parts of adjacent sections. A plurality of springs 42 are secured on an upper surface of the stopper clamp and an upper ring-plate 43 is secured to the top of the springs. It will be appreciated that one or more compression springs may be utilized to provide the impact absorbing system. As shown in FIG. 5, the intermediate sheath may itself be formed from sections bolted together by bolts 51 or other such securing mechanism.

It will be appreciated that rather than using the intermediate sheath 44, the neck portion 32 of the bend stiffener may be modified to include an abutment surface which can provide a surface to engage with the upper ring 43 connected to the compression springs. In such an embodiment it will be appreciated that the friction component provided by the intermediate sheath will not operate to retard the bend stiffener, however, parameters of the resilient spring/s may be selected so that the plummeting motion of the bend stiffener is stopped without need for such an intermediate sheath.

Figure 6:
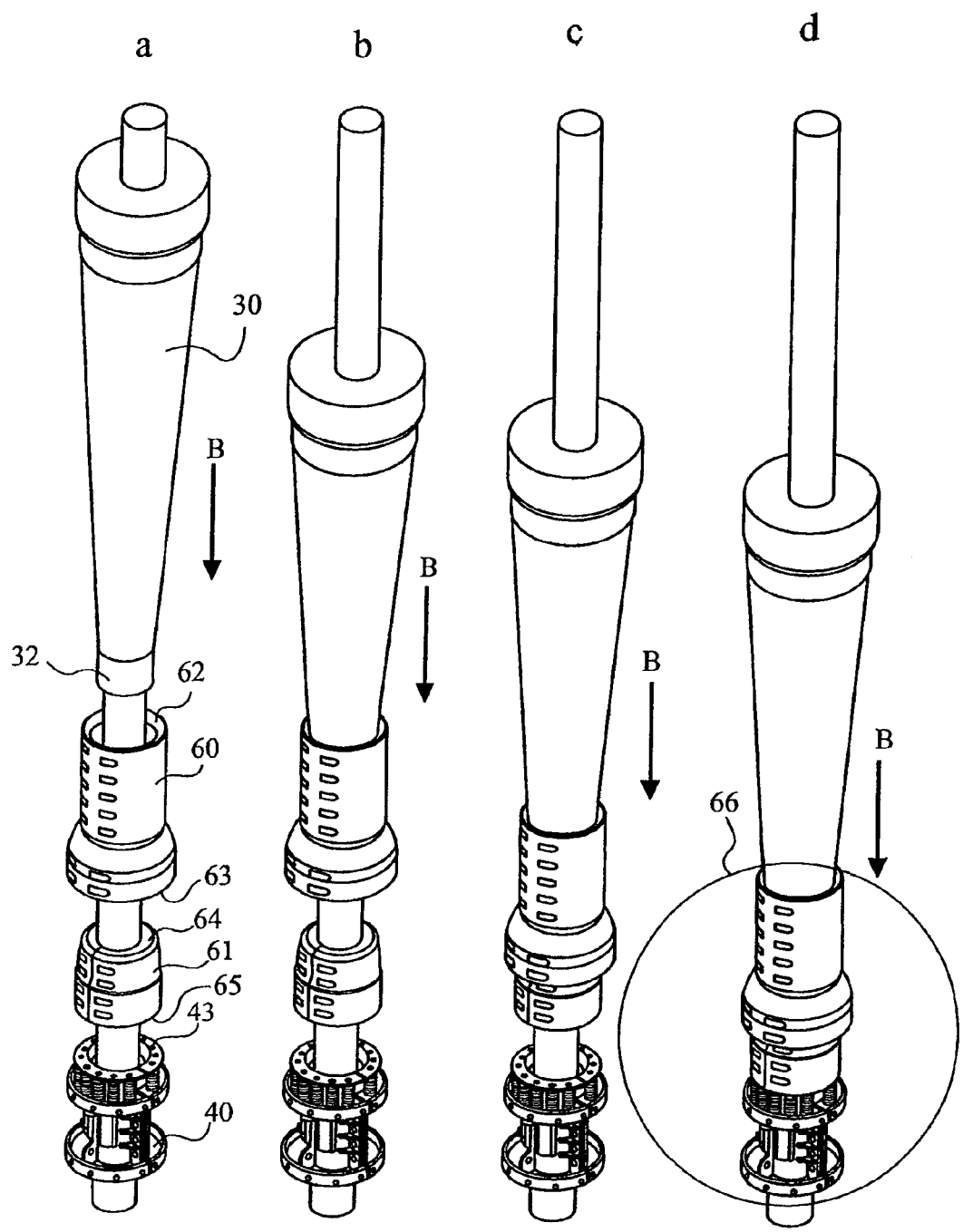
FIG. 6 illustrates use of a retardation element.

FIG. 6 illustrates a further embodiment of the present invention. The apparatus illustrated in FIG. 6 is in many ways similar to that illustrated in FIGS. 4 and 5 but with the intermediate sheath 44 replaced by two intermediate sheaths 60, 61. Each of these intermediate sheaths is clamped to a respective location on the flexible pipe body between a stopper clamp 40 and a location where a bend stiffener is to be secured to a rigid structure. The first intermediate sheath 60 includes an upper surface 62 which is shaped so as to accept the lower neck region 32 of the bend stiffener when the bend stiffener plummets due to a mistake being made during an assembly mode of operation. An end surface 63 of the upper intermediate sheath 60 is shaped to match an upper surface 64 of a lower intermediate sheath 61. The lower surface 65 of the lower intermediate sheath 61 provides an abutment surface to engage with the upper ring 43 secured to the resilient springs.

As illustrated in FIG. 6*b*, as the bend stiffener falls in an early stage, the lower neck region 32 of the bend stiffener will make a first impact with the first intermediate sheath 60. The two units will then move as one downwardly in the direction illustrated by arrow B. An inner surface of the first intermediate sheath has an inner diameter selected so as to closely match an outer surface of an outer sheath of the flexible pipe body. As such friction will begin to retard motion of the bend stiffener. As illustrated in FIG. 6*c* a second impact occurs when the first intermediate sheath and bend stiffener hit the second intermediate sheath 61. Again, an inner surface of the second intermediate sheath closely matches an outer surface of the flexible pipe body. As such friction will tend to prevent motion of the second intermediate sheath along the flexible pipe body. This friction component, together with a friction component associated with the first intermediate sheath 60, will together tend to resist motion of the bend stiffener downwardly. As illustrated in FIG. 6*d*, the bend stiffener, first intermediate sheath and second intermediate sheath, will generally eventually impact upon an upper surface of the ring plate 43 supported on the resilient springs. The springs act to absorb the energy of the fall so as to stop motion of the bend stiffener. The stopping motion is controlled so that tearing of the flexible pipe body is prevented. Circle 66 illustrates detail which is shown more clearly in FIG. 7.

Figure 7:
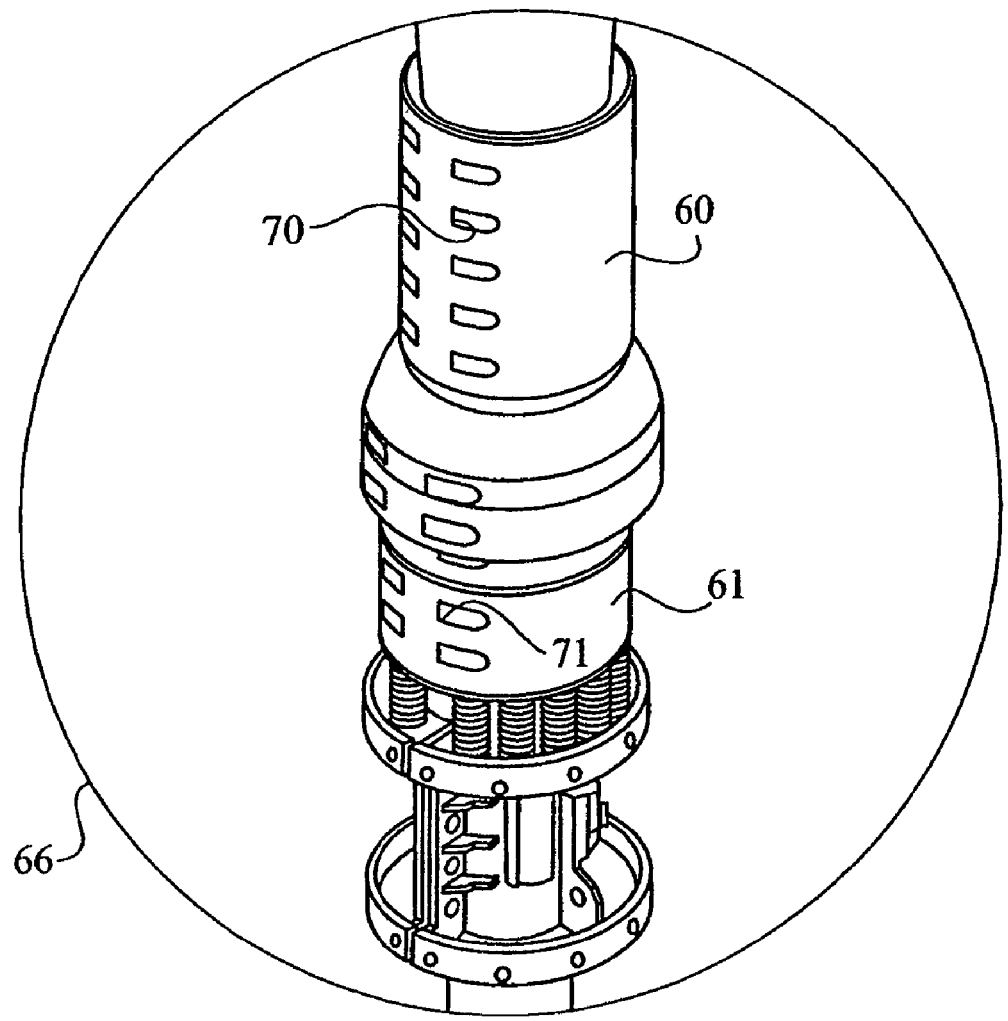
FIG. 7 illustrates a detail of FIG. 6.

As illustrated in FIG. 7, the lower narrow neck region of the bend stiffener is slotted within an open mouth of a first intermediate sheath 60. The intermediate sheath 60 includes an upper substantially cylindrical section together with an outwardly extending lower mouth portion. The first intermediate sheath is formed in two sections which are bolted together by virtue of bolts 70.

The lower intermediate sheath has an upper surface (not shown) which is shaped to match an internal shape of the open lower mouth of the first intermediate sheath. The lower intermediate sheath 61 is bolted together in sections using bolts 71. A lower surface of the second intermediate sheath impacts onto an abutment surface formed by an upper surface of ring-plate 43 secured via the resilient springs to the stopper clamp.

Figure 8:
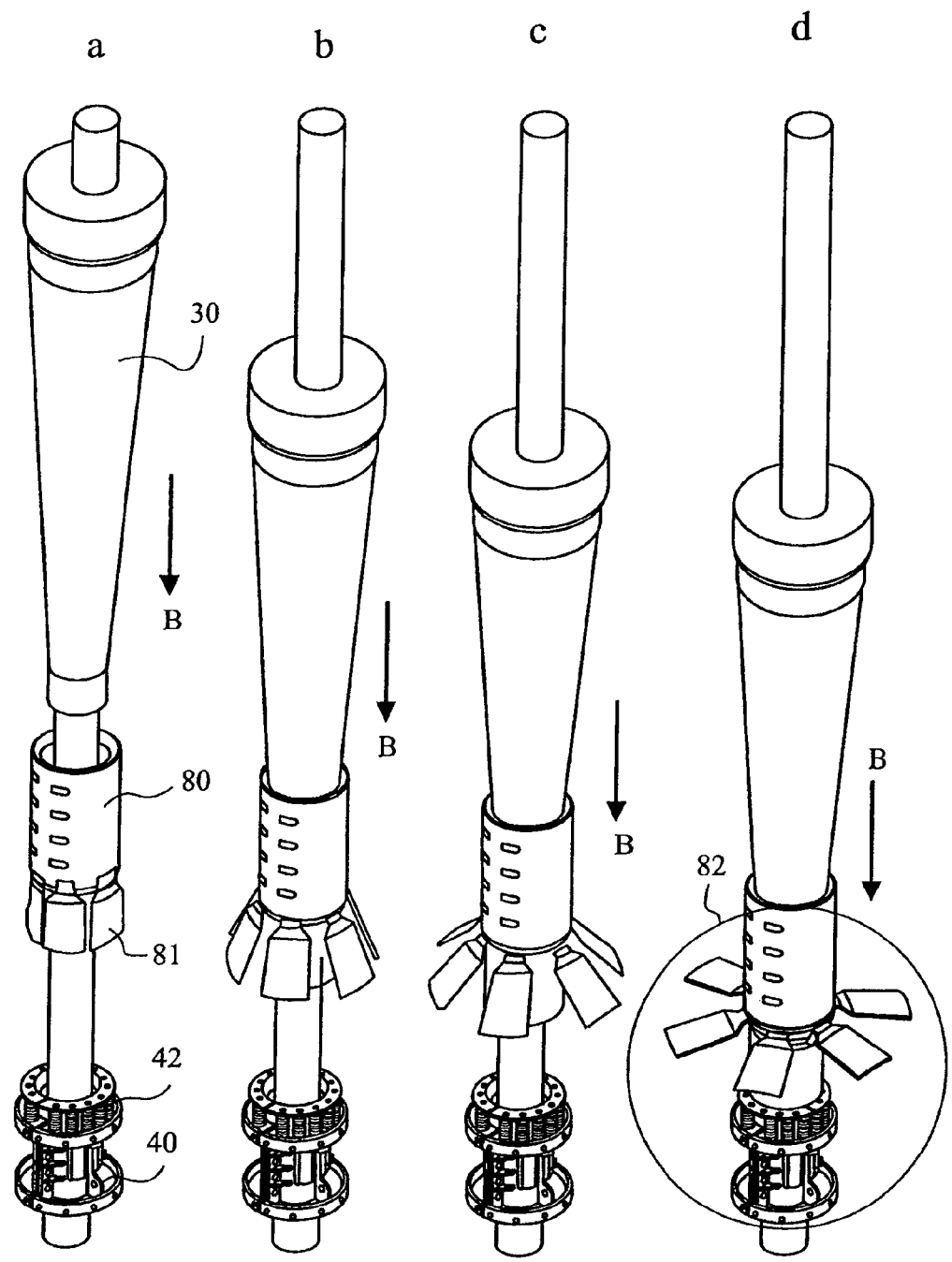
FIG. 8 illustrates use of a retardation element.

FIG. 8 illustrates an alternative embodiment of the present invention in which motion downwardly in the direction shown by arrow B of a bend stiffener 30 is retarded by a stopper clamp and associated resilient impact absorbing springs 42 together with an intermediate sheath 80. The intermediate sheath 80 is a substantially cylindrical body formed in two sections which may be bolted together. An inner bore of the cylindrical shaped body has an inner diameter closely matching that of a diameter of an outer layer such as an outer sheath of flexible pipe body. As such, when the intermediate sheath 80 is secured to the flexible pipe body, motion along the flexible pipe body is prevented. At a lower surface of the intermediate sheath 80 a number of retarding plates 81 are secured in a hinged fashion. As shown in FIG. 8*b*, as a bend stiffener falls a lower narrow portion of the bend stiffener impacts with the intermediate sheath 80. The neck region of the bend stiffener and upper and inner surface of the intermediate sheath body are configured to conveniently mate so that the bend stiffener and intermediate sheath 80 will begin to move downwardly in the direction shown by arrow B due to the momentum of the bend stiffener. The friction fit of the intermediate sheath will, to some extent, retard the downward motion of the bend stiffener. The downward motion of the intermediate sheath, however, begins to deploy the retarding plate 81. Each retarding plate begins to move outwardly by virtue of water pressure which will operate on a lower surface of each retardation plate. The retardation plates then begin to splay outwardly as shown in FIGS. 8c and 8d until fully deployed (see FIG. 8d). Deployment of the retardation plate 81 provides a substantial surface opposing downward motion. As such the water pressure will resist strongly downward motion of the bend stiffener. This in itself may be sufficient to stop downward motion of the bend stiffener. However, if not quite sufficient, the intermediate sheath 80 will then impact into an upper surface of the plate ring 43 secured to the resilient springs. These springs will absorb the impact and bring the bend stiffener and intermediate sheath to a halt without substantial damage to the flexible pipe body.

Figure 9:
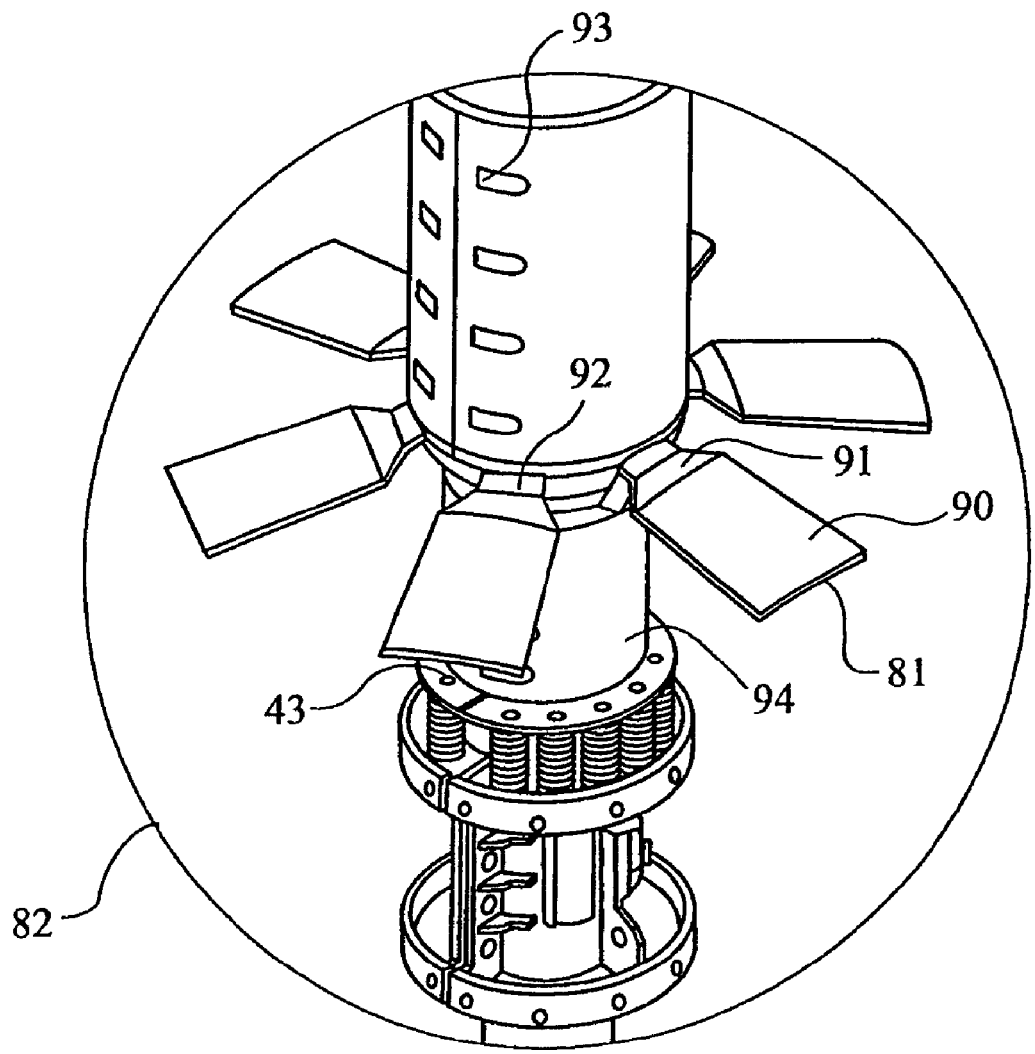
FIG. 9 illustrates a detail of FIG. 8.

The circle 82 illustrated in FIG. 8 is shown in more detail in FIG. 9. As illustrated in FIG. 9, each retarding plate 81 includes a substantially rectangular plate member 90 having a narrowing neck region 91 which has a hinge 92 securing the plate to an upper cylindrical portion of the intermediate sleeve 80. A stopper surface is provided to prevent each plate folding through 180° and thus lying flat against the sheath. The upper intermediate sleeve is formed in sections bolted together by bolts 93. When not deployed as shown in FIG. 8a the retardation plates conceal a lower cylindrical portion of the intermediate sheath. This lower portion 94 is illustrated more clearly in FIG. 9 and a lower surface of this lower portion of the intermediate sheath includes an abutment surface which will abut with the ring plate 43 secured to the top of the compression springs secured to the stopper clamp. It will be appreciated that the retardation plates provide a large drag factor preventing motion of the bend stiffener through water.

Figure 10:
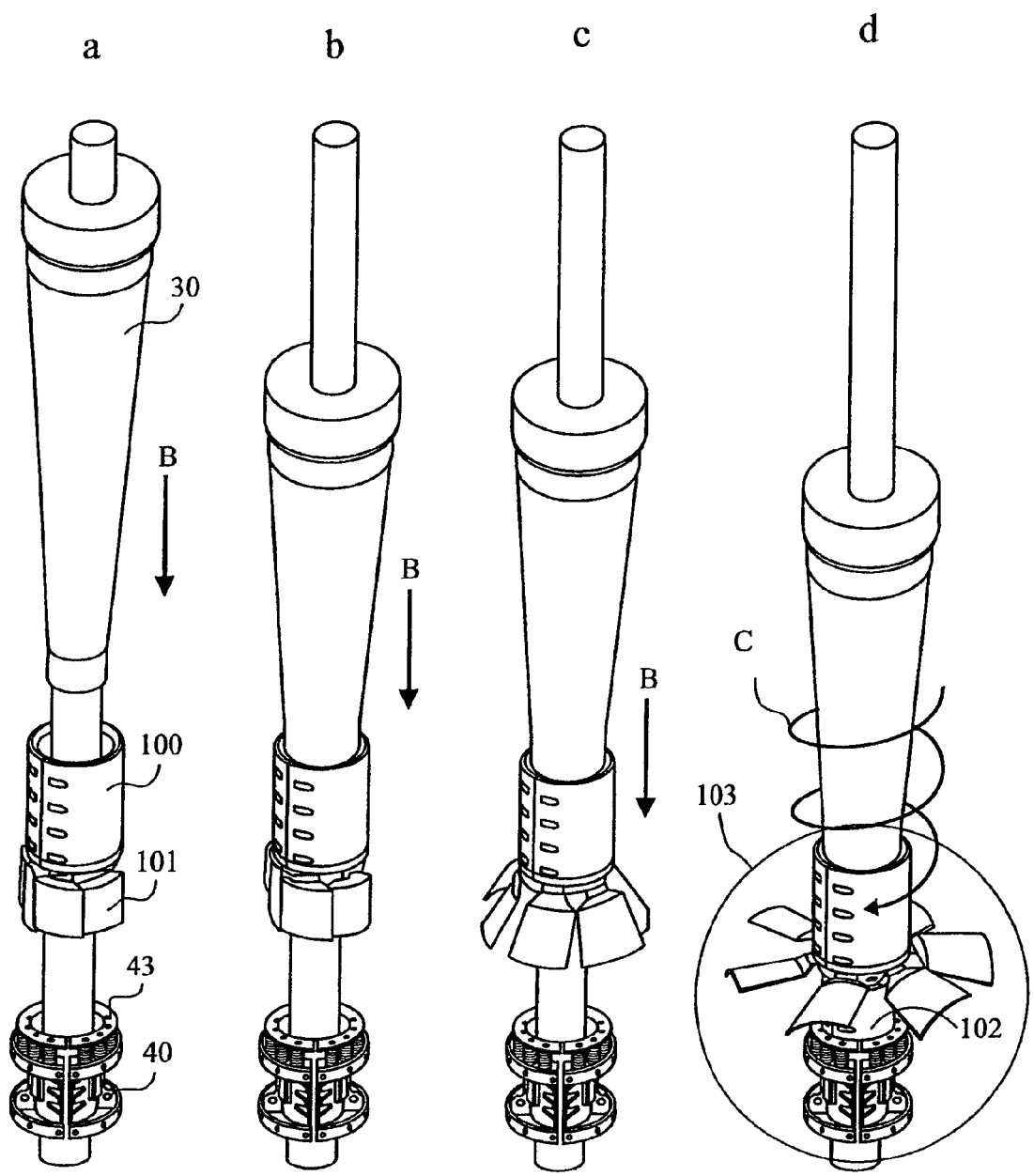
FIG. 10 illustrates use of a retardation element.

FIG. 10 illustrates an alternative embodiment of the present invention in which an intermediate sheath 100 is located on a portion of flexible pipe body between a stopper clamp 40 and a bend stiffener 30. The intermediate sheath 100 includes a substantially cylindrical body portion having an inner surface having a bore configured to closely match an outer surface of the flexible pipe body. As such the intermediate sheath 100 can be clamped at a desired location with respect to the flexible pipe body between the stopper clamp 40 and a location where the bend stiffener is to be secured to a rigid structure. A number of retardation plates 101 are each secured to the intermediate sheath via a hinge. As illustrated in FIG. 10b, as the bend stiffener plummets downwardly a narrow neck region of the bend stiffener will impact with an upper open mouth region of the intermediate sheath. The bend stiffener and intermediate sheath will then move as one downwardly although a friction force between an inner surface of the intermediate sheath and outer surface of the flexible pipe body may act to resist movement. The retardation plates will then begin to deploy by virtue of water pressure urging an inner surface of the retardation plate outwardly so as to lift the plates. A stopper surface is provided to prevent each plate folding through 180° and thus lying flat against the sheath. As opposed to the retardation plates illustrated in FIGS. 8 and 9, the retardation plates in FIG. 10 have a curved profile much like an aerofoil. The plates are also secured to the intermediate sheath so as to cause a rotation of the intermediate sheath and bend stiffener as it moves downwardly. This spiral motion illustrated by arrow C in FIG. 10 and the cross section of the retardation plates causes lift to the bend stiffener and intermediate sheath as it tends to move downwardly. This lift can substantially reduce the downward motion and may even bring that motion to a halt. If the motion is not wholly prevented then a lower cylindrical section 102 illustrated in FIG. 10d will impact upon an upper surface of the plate ring 43 secured to the top of the compression springs. The energy of this impact will be absorbed by the springs which will bring movement of the bend stiffener and intermediate sleeve to a halt. The circle 103 of FIG. 10 is illustrated more clearly in FIG. 11.

Figure 11:
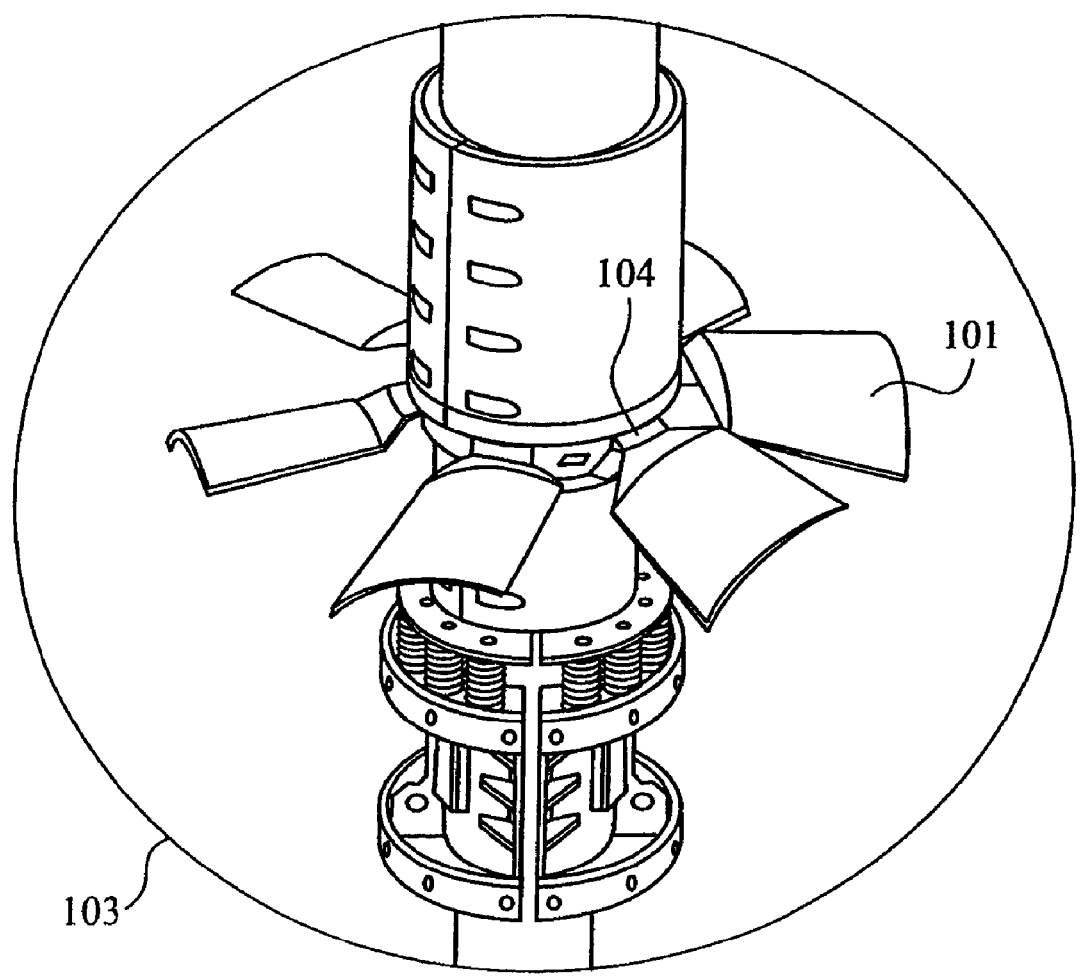
FIG. 11 illustrates a detail of FIG. 10.

As illustrated in FIG. 11, each retardation plate 101 has a curved cross section a little like an aerofoil and is secured via a respective hinge 104 to an upper portion of the intermediate sleeve. The plates are mounted at an angle with respect to the intermediate sheath so that the combined effect of the plates when deployed is to induce a rotation of the intermediate sleeve and the bend stiffener moving with the intermediate sleeve. This rotation will cause an aerofoil-like effect to be induced by the curved profile of the retardation plates. This will cause a lifting force as will be appreciated by those skilled in the art. If this lifting force is not sufficient to entirely stop downward motion of the bend stiffener and intermediate sheath, a lower surface of a lower cylindrical portion of the intermediate sheath will impact onto the impact absorption system formed by the springs and ring plates secured to the stopper clamp. This system will absorb any remaining energy from the force and bring the bend stiffener and intermediate sheath to a halt.

A number of embodiments of the present invention have been described hereinabove. It will be understood that subsequent to motion of the bend stiffener being arrested, users will then be able to regain the bend stiffener and pull it upwardly back into a position where it can be secured to a rigid structure. The motion of the bend stiffener during the plummeting phase is retarded and ultimately stopped without damage to the flexible pipe body. This means that the flexible pipe body does not need to be resectioned and/or terminated.

It will be appreciated that in accordance with embodiments of the present invention any of the intermediate sheath sections described hereinabove can be made as a single integral piece which is threaded onto the flexible pipe body rather than being clamped on and secured by bolts 70.

Embodiments of the present invention have been described hereinabove with reference to a number of different elements which provide some retardation of the bend stiffener. It will be appreciated that embodiments of the present invention can use one or more of the variously described embodiments in combination or alone. For example, a stopper clamp may be utilized without the resilient springs and ring plates. Deployment of one or more intermediate elements as described hereinabove will retard the bend stiffener during a fall to a sufficiently slow velocity that impact into an upper surface of the stopper clamp will not cause damage to the flexible pipe body.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. Apparatus for governing motion of a bend stiffener along a flexible pipe, comprising:
   a stopper clamp secured to a portion of flexible pipe body; and
   at least one retardation element located on the flexible pipe body at a predetermined position with respect to the stopper clamp;
   wherein said retardation element is arranged to reduce momentum of a bend stiffener as it moves along said portion of flexible pipe body in a direction towards said stopper clamp.

2. The apparatus as claimed in claim 1, comprising:
   a retardation element comprising one or more compression spring elements provided above an upper surface of said stopper clamp.

3. The apparatus as claimed in claim 2 wherein said one or more spring elements comprises a ring of spring elements extending circumferentially around the flexible pipe body and said retardation element further comprises a ring-shaped plate extending around the flexible pipe body and secured to an upper end of each spring element.

4. The apparatus as claimed in claim 1, comprising:
   a retardation element comprising a high friction sheath member comprising an inner sliding surface with an internal dimension selected to match an outer surface of the flexible pipe body;
   wherein motion of the bend stiffener urges the sheath member into sliding movement, such sliding movement tending to retard motion of the bend stiffener.

5. Apparatus as claimed in claim 1, comprising: a retardation element comprising a high drag element comprising a sleeve element, said sleeve element having an inner bore for sliding along the outer surface of the flexible pipe body, and including at least one high drag member for retarding motion of the sleeve along the flexible pipe body.

6. The apparatus as claimed in claim 5, wherein said at least one high drag member comprises a plurality of drag plates.

7. The apparatus as claimed in claim 6, wherein each of said drag plates is hingedly secured to the sleeve element and is arranged to move from a folded low drag position to an unfolded position in which the plates provide a drag surface.

8. The apparatus as claimed in claim 1, comprising:
   a retardation element comprising a lift element comprising a sleeve element, said sleeve element having an inner bore for sliding along the outer surface of the flexible pipe body, and including at least one aerofoil member for providing lift to the lift element in a first direction as it is urged in a direction opposite to said first direction.

9. The apparatus as claimed in claim 7 wherein said at least one aerofoil member comprises a plurality of curved plates each having an aerofoil cross section.

10. The apparatus as claimed in claim 8 wherein each aerofoil plate is hingedly secured to the sleeve to move from a folded position to an unfolded position in which the plates each provide a lift force.

11. A method for governing motion of a bend stiffener along a flexible pipe, comprising the steps of:
    securing a stopper clamp to a portion of flexible pipe body;
    providing at least one retardation element on the pipe body at a predetermined location with respect to the stopper clamp; and
    if a bend stiffener moves along the portion of flexible pipe body, reducing the momentum of the bend stiffener via said retardation element.

12. The method as claimed in claim 11, further comprising the steps of:
    providing a ring of compression springs on an upper surface of the stopper clamp.

13. The method as claimed in claim 11, further comprising the steps of:
    providing a high friction sheath member between said stopper clamp and bend stiffener.

14. The method as claimed in claims 11, further comprising the steps of:
    providing a high drag element between said stopper clamp and bend stiffener.

15. The method as claimed in claims 11, further comprising the steps of:
    providing a lift element between said stopper clamp and bend stiffener.

* * * * *